United States Patent
Sharnoff et al.

(10) Patent No.: US 11,315,195 B1
(45) Date of Patent: Apr. 26, 2022

(54) SYSTEMS AND METHODS FOR DETERMINING VALIDATION TIMES

(71) Applicant: BlueOwl, LLC, San Francisco, CA (US)

(72) Inventors: David Sharnoff, Orinda, CA (US); Shilpi Bansal, Pleasant Hill, CA (US); Aaron Lehmann, San Francisco, CA (US); Vijay Dewangan, Dublin, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

(21) Appl. No.: 16/928,389

(22) Filed: Jul. 14, 2020

(51) Int. Cl.
| | |
|---|---|
| *G06Q 40/08* | (2012.01) |
| *G06F 16/23* | (2019.01) |
| *G06Q 30/00* | (2012.01) |
| *G06Q 10/10* | (2012.01) |
| *G06Q 30/04* | (2012.01) |

(52) U.S. Cl.
CPC ......... *G06Q 40/08* (2013.01); *G06F 16/2379* (2019.01); *G06Q 10/10* (2013.01); *G06Q 30/0185* (2013.01); *G06Q 30/04* (2013.01)

(58) Field of Classification Search
CPC .... G06Q 40/08; G06Q 10/10; G06Q 30/0185; G06Q 30/04; G06F 16/2379
USPC ...................................................... 705/3–44
See application file for complete search history.

(56) References Cited

U.S. PATENT DOCUMENTS

| | | | |
|---|---|---|---|
| 5,655,085 A | * | 8/1997 | Ryan ..................... G06Q 40/02 705/4 |
| 7,453,190 B2 | | 11/2008 | Biberstein et al. |
| 7,681,064 B2 | | 3/2010 | Engler et al. |
| 8,271,301 B1 | * | 9/2012 | Nordyke ................ G06Q 40/08 705/4 |

(Continued)

FOREIGN PATENT DOCUMENTS

WO       01/84315 A2    11/2001

OTHER PUBLICATIONS

GFI Investor Day New York, Fair Dsiclosure Wire, Proquest Doc. Id. 466900931, Linthicum May 10. (Year: 2007).*

(Continued)

*Primary Examiner* — Frantzy Poinvil
(74) *Attorney, Agent, or Firm* — Faegre Drinker Biddle & Reath LLP

(57) ABSTRACT

Method and system for validating a plurality of policies. For example, a computer-implemented method includes receiving a plurality of policies, each policy of the plurality of policies associated with a policy lifecycle including one or more validation actions, each validation action of the one or more validation actions being associated with an action time; mapping the one or more validation actions associated with each policy of the plurality of policies on a common timeline of a shared clock; and determining the plurality of validation times based at least in part upon the action time associated with each validation action of the one or more validation actions by at least one of: minimizing the amount of validation times of the plurality of validation times; and maximizing the amount of validation actions contained within each validation time of the plurality of validation times on average across the plurality of validation threads.

20 Claims, 3 Drawing Sheets

(56) References Cited

U.S. PATENT DOCUMENTS

| | | | | |
|---|---|---|---|---|
| 8,428,983 B2* | 4/2013 | Bobak | | G06Q 10/06 |
| | | | | 705/7.11 |
| 8,639,536 B2* | 1/2014 | Reynolds | | G06Q 10/10 |
| | | | | 705/4 |
| 9,292,405 B2 | 3/2016 | Wankawala et al. | | |
| 9,460,408 B2 | 10/2016 | Berlandier et al. | | |
| 2005/0144114 A1* | 6/2005 | Ruggieri | | G06Q 40/08 |
| | | | | 705/37 |
| 2006/0235728 A1* | 10/2006 | Yogesh | | G06Q 40/08 |
| | | | | 705/3 |
| 2007/0180490 A1* | 8/2007 | Renzi | | H04L 63/145 |
| | | | | 726/1 |
| 2009/0138795 A1* | 5/2009 | Liu | | G06F 9/448 |
| | | | | 715/234 |
| 2010/0004957 A1* | 1/2010 | Ball | | G06Q 40/00 |
| | | | | 705/4 |
| 2010/0223072 A1* | 9/2010 | Jacobson | | G06Q 40/08 |
| | | | | 705/3 |
| 2011/0125537 A1* | 5/2011 | Reynolds | | G06Q 10/10 |
| | | | | 705/4 |
| 2013/0246093 A1* | 9/2013 | Ranicar, III | | G06Q 10/10 |
| | | | | 705/2 |
| 2014/0289152 A1* | 9/2014 | Cooper | | G06Q 10/1057 |
| | | | | 705/322 |
| 2016/0125547 A1* | 5/2016 | Dubeau | | G06Q 40/08 |
| | | | | 705/4 |
| 2016/0231716 A1 | 8/2016 | Johnson et al. | | |
| 2017/0091289 A1 | 3/2017 | Ohazulike et al. | | |
| 2017/0278148 A1 | 9/2017 | Foster | | |
| 2019/0340012 A1* | 11/2019 | Granito | | G06F 9/466 |
| 2020/0210978 A1* | 7/2020 | Brown | | H04L 9/3239 |

OTHER PUBLICATIONS

Inci et al., "Intraday behavior of stock prices and trades around insider trading", Financial Management 39.1:323(41), Financial Management Association, April-June . (Year: 2010).*

Solution, Vornex, retrieved at https://www.vornexinc.com/solutions.htm, retrieved on Sep. 27, 2021, 2 pages.

Solution-Soft, "How Exactly Does Time Shift Testing Work?", Retrieved from https://solution-soft.com/content/how-exactly-does-time-shift-testing-work, Mar. 2017, 2 pages.

* cited by examiner

SYSTEMS AND METHODS FOR DETERMINING VALIDATION TIMES

FIELD OF THE DISCLOSURE

Some embodiments of the present disclosure are directed to testing of policy system. More particularly, certain embodiments of the present disclosure provide methods and systems for determining validation times. Merely by way of example, the present disclosure has been applied to insurance policies, but it would be recognized that the present disclosure has much broader range of applicability.

BACKGROUND OF THE DISCLOSURE

In the insurance domain, validating a large quantity policy of lifecycle scenarios is a challenging problem known to be expensive, not just in time but also cost, in part due to its significant resource consumption. Therefore, it is desirable to have a more efficient way to validate a large quantity of policy lifecycle scenarios.

BRIEF SUMMARY OF THE DISCLOSURE

Some embodiments of the present disclosure are directed to testing of policy system. More particularly, certain embodiments of the present disclosure provide methods and systems for determining validation times. Merely by way of example, the present disclosure has been applied to insurance policies, but it would be recognized that the present disclosure has much broader range of applicability.

According to various embodiments, a computer-implemented method for validating a plurality of policies includes receiving a plurality of policies, each policy of the plurality of policies associated with a policy lifecycle including one or more validation actions, each validation action of the one or more validation actions being associated with an action time; mapping the one or more validation actions associated with each policy of the plurality of policies on a common timeline of a shared clock; and determining the plurality of validation times based at least in part upon the action time associated with each validation action of the one or more validation actions by at least one of: minimizing the amount of validation times of the plurality of validation times; and maximizing the amount of validation actions contained within each validation time of the plurality of validation times on average across the plurality of validation threads.

According to various embodiments, a system for validating a plurality of policies includes: a policy receiving module configured to receive a plurality of policies, each policy of the plurality of policies associated with a policy lifecycle including one or more validation actions, each validation action of the one or more validation actions being associated with an action time; an action mapping module configured to map the one or more validation actions associated with each policy of the plurality of policies on a common timeline of a shared clock; and a validation time determining module configured to determine the plurality of validation times based at least in part upon the action time associated with each validation action of the one or more validation actions by at least one of: minimizing the amount of validation times of the plurality of validation times; and maximizing the amount of validation actions contained within each validation time of the plurality of validation times on average across the plurality of validation threads.

According to various embodiments, a non-transitory computer-readable medium with instructions stored thereon, that when executed by a processor, causes the processor to perform: receiving a plurality of policies, each policy of the plurality of policies associated with a policy lifecycle including one or more validation actions, each validation action of the one or more validation actions being associated with an action time; mapping the one or more validation actions associated with each policy of the plurality of policies on a common timeline of a shared clock; and determining the plurality of validation times based at least in part upon the action time associated with each validation action of the one or more validation actions by at least one of: minimizing the amount of validation times of the plurality of validation times; and maximizing the amount of validation actions contained within each validation time of the plurality of validation times on average across the plurality of validation threads.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Figure 1:
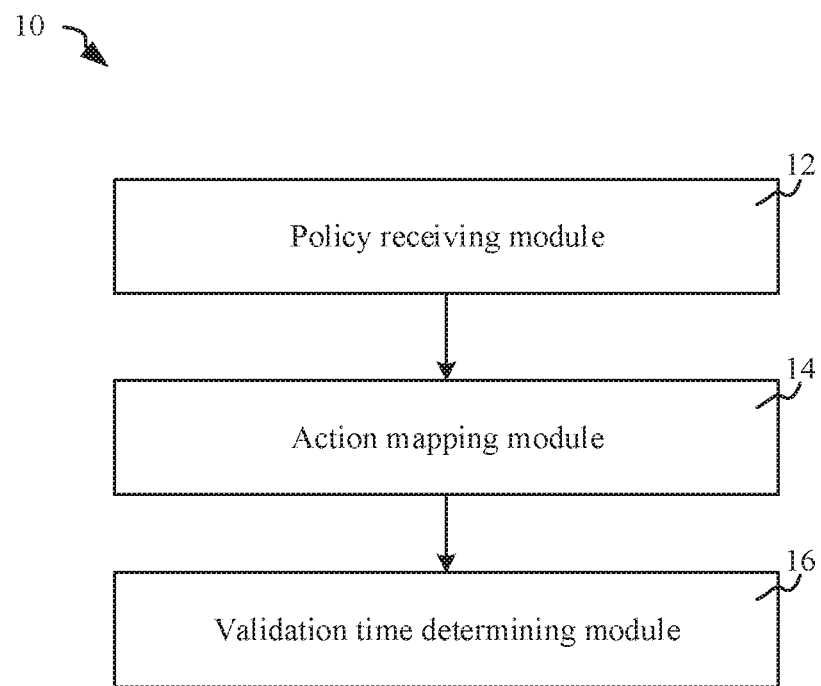
FIG. 1 is a simplified diagram showing a system for determining validation times, according to various embodiments of the present disclosure.

Some embodiments of the present disclosure are directed to testing of policy system. More particularly, certain embodiments of the present disclosure provide methods and systems for determining validation times. Merely by way of example, the present disclosure has been applied to insurance policies, but it would be recognized that the present disclosure has much broader range of applicability.

In various embodiments, the systems and methods of the present disclosure accelerates the validation of a large quantity of policy lifecycle scenarios that map across multiple months and/or years. In some examples, each scenario of the large quantity of policy lifecycle scenarios may contain a policy journey including multiple actions requiring multiple time jumps. In certain examples, a time jump is a date jump. In various examples, the multiple actions include a first action at a first time, and a second action at a second time, then during the validation process, a validation clock (e.g., a server clock, a system clock, or an independent clock that moves independently of the system clock) is configured to jump to a first validation time corresponding the first time to validate the first action and to a second validation time corresponding to the second time to validate the second action. In some examples, one or more validations are performed after performance of each action of a policy lifecycle. For example, a clock (e.g., a server clock, a system clock, or an independent clock that moves independently of the system clock) is moved to a first time, a first action is performed, one or more validations are performed, the clock is moved to a second time, a second action is performed, and the one or more validations are performed again. In certain examples, the action time is an action time range and the validation time is determined to be within the action time range. Since each time jump takes time (e.g., a few seconds) to complete, the systems and methods of the present disclosure, according to various examples, accelerate the validation process by reducing and/or minimizing the amount of time jumps. In various embodiments, the systems and methods of the present disclosure reduces the amount of time jumps by validating multiple policy lifecycle scenarios in parallel instead of in serial. That is, instead of validating all the actions of a first scenario, one or more actions of a second scenario may be validated before, simultaneously, and/or after one or more actions. The systems and methods of the present disclosure, according to various examples, optimize time-travel of multiple policy lifecycle to achieve improved validation efficiency and capacity, for that the same amount of scenarios may be validated at reduced time. In some examples, the reduction in resource consumption (e.g., time) also reduces costs and improve system performance for that more scenarios may be validated within the same amount of time. In certain examples, a product may be released faster and/or released with superior accuracy and capacity.

One or More Systems for Determining Validation Times According to Various Embodiments FIG. 1 is a simplified diagram showing a system for determining validation times, according to various embodiments of the present disclosure. This diagram is merely an example, which should not unduly limit the scope of the claims. One of ordinary skill in the art would recognize many variations, alternatives, and modifications. In some examples, the system 10 includes a policy receiving module 12, an action mapping module 14, and a validation time determining module 16. In certain examples, the system 10 is configured to implement method 100 of FIG. 2. Although the above has been shown using a selected group of components, there can be many alternatives, modifications, and variations. For example, some of the components may be expanded and/or combined. Some components may be removed. Other components may be inserted to those noted above. Depending upon the embodiment, the arrangement of components may be interchanged with others replaced.

In various embodiments, the policy receiving module 12 is configured to receive a plurality of policies, where each policy of the plurality of policies is associated with a policy lifecycle including one or more validation actions. In some examples, each validation action of the one or more validation actions is associated with an action time. For example, the plurality of policies may include policy A and policy B. In certain examples, Policy A may have a policy lifecycle including a first validation action, action 1A, associated with a first action time, time 1A, a second validation action, action 2A, associated with a second action time, time 2A, and a third validation action, action 3A, associated with a third action time, time 3A. Policy B may have a policy lifecycle including a first validation action, action 1B, associated with a first action time, time 1B, and a second validation action, action 2B, associated with a second action time, time 2B.

In various embodiments, the action mapping module 14 is configured to map the one or more validation actions associated with each policy of the plurality of policies on a common timeline of a shared clock. For example, the action mapping module 14 may map the validation actions of policy A and policy B onto the common timeline such that action 1A, action 2A, action 3A, action 1B, and action 2B are mapped serially and/or parallelly based at least in part upon their associated action times, time 1A, time 2A, time 3A, time 1B, and time 2B.

In various embodiments, the validation time determining module 16 is configured to determine the plurality of validation times based at least in part upon the action time associated with each validation action of the one or more validation actions by at least minimizing the amount of validation times of the plurality of validation times, and/or maximizing the amount of validation actions contained within each validation time of the plurality of validation times on average across the plurality of validation threads.

In various embodiments, the system 10 further includes a policy validating module configured to parallelly validate (e.g., each policy on one validation thread) the plurality of policies by at least moving the shared clock forward in time (e.g., from time zero) through a plurality of validation times, and executing the one or more validation actions associated with the plurality of policies at the plurality of validation times. In some examples, an action module is configured to map one or more transactions or actions to a policy lifecycle as per the scenario defined for validation, moves a shared clock (e.g., a server clock, a system clock, or an independent clock that moves independently of the system clock) to a first action time associated with a first action, performs the first action, optionally wait for delayed jobs or actions to finish, and validates one or more details associated with the policy, then move it to a second time associated with a second action, perform the second action, and validate the one or more details again. In some examples, the policy validating module is configured to validate each policy of the plurality of policies in a separate thread of a plurality of validation threads. In certain examples, the policy validating module is configured to execute the one or more validation actions parallelly across different threads of the plurality of validation threads and sequentially and/or parallelly within each thread. In some examples, the policy validating module is configured to move the shared clock to a first validation time of the plurality of validation times before to a second validation time of the plurality of validation times. In various examples, the first validation time is earlier than the second validation time. In certain examples, the first validation time contains a first validation action on a first validation thread of the plurality of validation threads and is associated with a first action time. In certain examples, the second validation time contains a second validation action on a second validation thread of the plurality of validation threads and is associated with a second action time. In various examples, the policy validating module is configured to prevent the shared clock to move backward in time. In various examples, various details associated with a policy is validated at each validation action.

Figure 2:
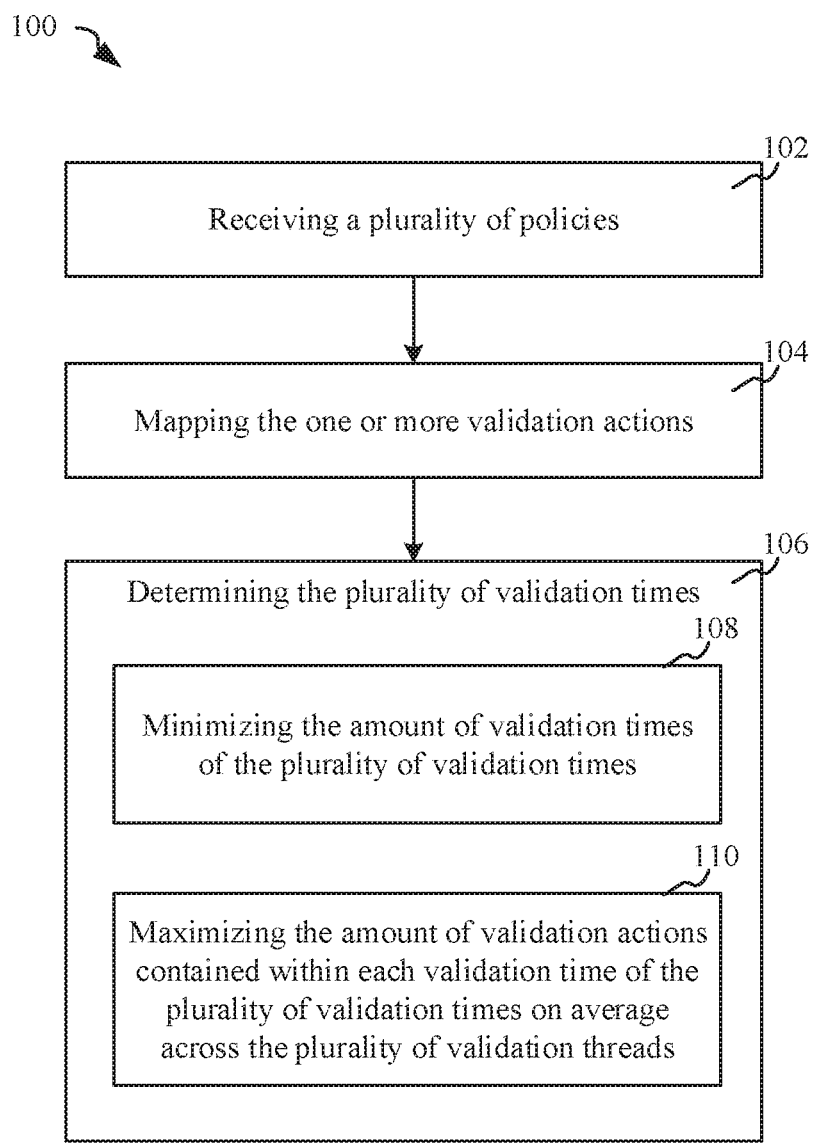
FIG. 2 is a simplified diagram showing a method for determining validation times, according to various embodiments of the present disclosure.

One or More Methods for Determining Validation Times According to Various Embodiments FIG. 2 is a simplified method for determining validation times according to various embodiments of the present disclosure. This diagram is merely an example, which should not unduly limit the scope of the claims. One of ordinary skill in the art would recognize many variations, alternatives, and modifications. The method 100 includes a process 102 of receiving a plurality of policies, a process 104 of mapping the one or more validation actions, and a process 106 of determining the plurality of validation times. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

In various embodiments, the process 102 of receiving a plurality of policies includes receiving a plurality of policies, where each policy of the plurality of policies is associated with a policy lifecycle and includes one or more validation actions. In various examples, each validation action of the one or more validation actions is associated with an action time. In some examples, one or more policies of the plurality of policies has a policy lifecycle spanning one or more hours, one or more days, one or more weeks, one or more months, one or more years, and/or one or more decades. In certain examples, the action time is one of a time point and a time range.

In various embodiments, the process 104 of mapping the one or more validation actions includes mapping the one or more validation actions associated with each policy of the plurality of policies on a common timeline of a shared clock.

In various embodiments, the process 106 of determining the plurality of validation times includes a process 108 of minimizing the amount of validation times of the plurality of validation times and/or a process 110 of maximizing the amount of validation actions contained within each validation time of the plurality of validation times on average across the plurality of validation threads.

In various embodiments, the method 100 further includes the process of parallelly validating the plurality of policies includes validating each policy of the plurality of policies in a separate thread of a plurality of validation threads. In some examples, the process of parallelly validating the plurality of policies includes a process of moving the shared clock forward in time through a plurality of validation times, and a process of executing the one or more validation actions associated with the plurality of policies at the plurality of validation times.

In some embodiments, the process of moving the shared clock forward in time through a plurality of validation times includes moving to a first validation time of the plurality of validation times before moving to a second validation time of the plurality of validation times. In various examples, the first validation time is earlier than the second validation time. In certain examples, the first validation time contains a first validation action on a first validation thread of the plurality of validation threads and is associated with a first action time. In certain examples, the second validation time contains a second validation action on a second validation thread of the plurality of validation threads and is associated with a second action time. In certain examples, the process of moving the shared clock forward in time includes preventing the shared clock to move backward in time. In certain examples, the process of moving the shared clock forward in time through a plurality of validation times includes moving the shared clock forward in time through the plurality of validation times one after another sequentially.

In some embodiments, the process of executing the one or more validation actions includes executing the one or more validation actions parallelly across different threads of the plurality of validation threads and sequentially and/or parallelly within each thread. In some examples, the one or more validation actions includes policy purchase, driver modification, driver addition, driver removal, invoicing, vehicle modification, vehicle addition, vehicle removal, coverage modification, property modification, property addition, property removal, user info modification, policy reinstatement, policy repurchase, policy rewrite, policy re-rating, and/or policy termination. In certain examples, multiple validation actions share the same action time.

One or More Computer Devices According to Various Embodiments

Figure 3:
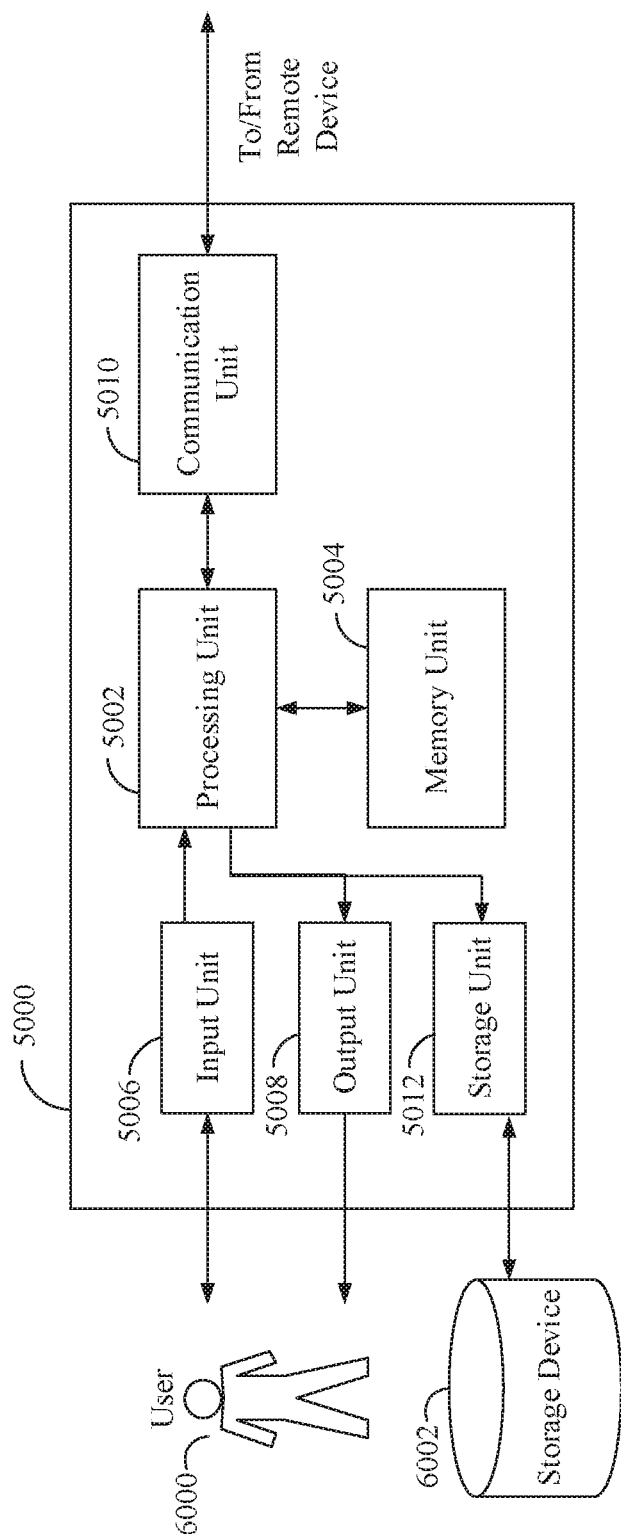
FIG. 3 is a simplified diagram showing a computer device, according to various embodiments of the present disclosure.

FIG. 3 is a simplified diagram showing a computer device 5000, according to various embodiments of the present disclosure. This diagram is merely an example, which should not unduly limit the scope of the claims. One of ordinary skill in the art would recognize many variations, alternatives, and modifications. In some examples, the computer device 5000 includes a processing unit 5002, a memory unit 5004, an input unit 5006, an output unit 5008, and a communication unit 5010. In various examples, the computer device 5000 is configured to be in communication with a user 5100 and/or a storage device 5200. In certain examples, the system computer device 5000 is configured according to system 10 of FIG. 1 and/or to implement method 100 of FIG. 2. Although the above has been shown using a selected group of components, there can be many alternatives, modifications, and variations. For example, some of the components may be expanded and/or combined. Some components may be removed. Other components may be inserted to those noted above. Depending upon the embodiment, the arrangement of components may be interchanged with others replaced.

In various embodiments, the processing unit 5002 is configured for executing instructions, such as instructions to implement method 100 of FIG. 2. In some embodiments, executable instructions may be stored in the memory unit 5004. In some examples, the processing unit 5002 includes one or more processing units (e.g., in a multi-core configuration). In certain examples, the processing unit 5002 includes and/or is communicatively coupled to one or more modules for implementing the systems and methods described in the present disclosure. In some examples, the processing unit 5002 is configured to execute instructions within one or more operating systems, such as UNIX, LINUX, Microsoft Windows®, etc. In certain examples, upon initiation of a computer-implemented method, one or more instructions is executed during initialization. In some examples, one or more operations is executed to perform one or more processes described herein. In certain examples, an operation may be general or specific to a particular programming language (e.g., C, C#, C++, Java, or other suitable programming languages, etc.). In various examples, the processing unit 5002 is configured to be operatively coupled to the storage device 5200, such as via an on-board storage unit 5012.

In various embodiments, the memory unit 5004 includes a device allowing information, such as executable instructions and/or other data to be stored and retrieved. In some examples, memory unit 5004 includes one or more computer readable media. In some embodiments, stored in memory unit 5004 include computer readable instructions for providing a user interface, such as to the user 5004, via the output unit 5008. In some examples, a user interface includes a web browser and/or a client application. In various examples, a web browser enables one or more users, such as the user 5004, to display and/or interact with media and/or other information embedded on a web page and/or a website. In certain examples, the memory unit 5004 include computer readable instructions for receiving and processing an input, such as from the user 5004, via the input unit 5006. In certain examples, the memory unit 5004 includes random access memory (RAM) such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAN).

In various embodiments, the input unit 5006 is configured to receive input, such as from the user 5004. In some examples, the input unit 5006 includes a keyboard, a pointing device, a mouse, a stylus, a touch sensitive panel (e.g., a touch pad or a touch screen), a gyroscope, an accelerometer, a position detector (e.g., a Global Positioning System), and/or an audio input device. In certain examples, the input unit 5006, such as a touch screen of the input unit, is configured to function as both the input unit and the output unit.

In various embodiments, the output unit 5008 includes a media output unit configured to present information to the user 5004. In some embodiments, the output unit 5008 includes any component capable of conveying information to the user 5004. In certain embodiments, the output unit 5008 includes an output adapter, such as a video adapter and/or an audio adapter. In various examples, the output unit 5008, such as an output adapter of the output unit, is operatively coupled to the processing unit 5002 and/or operatively coupled to an presenting device configured to present the information to the user, such as via a visual display device (e.g., a liquid crystal display (LCD), a light emitting diode (LED) display, an organic light emitting diode (OLED) display, a cathode ray tube (CRT) display, an "electronic ink" display, a projected display, etc.) or an audio display device (e.g., a speaker arrangement or headphones).

In various embodiments, the communication unit 5010 is configured to be communicatively coupled to a remote device. In some examples, the communication unit 5010 includes a wired network adapter, a wireless network adapter, a wireless data transceiver for use with a mobile phone network (e.g., Global System for Mobile communications (GSM), 3G, 4G, or Bluetooth), and/or other mobile data networks (e.g., Worldwide Interoperability for Microwave Access (WIMAX)). In certain examples, other types of short-range or long-range networks may be used. In some examples, the communication unit 5010 is configured to provide email integration for communicating data between a server and one or more clients.

In various embodiments, the storage unit 5012 is configured to enable communication between the computer device 5000, such as via the processing unit 5002, and an external storage device 5200. In some examples, the storage unit 5012 is a storage interface. In certain examples, the storage interface is any component capable of providing the processing unit 5002 with access to the storage device 5200. In various examples, the storage unit 5012 includes an Advanced Technology Attachment (ATA) adapter, a Serial ATA (SATA) adapter, a Small Computer System Interface (SCSI) adapter, a RAID controller, a SAN adapter, a network adapter, and/or any other component capable of providing the processing unit 5002 with access to the storage device 5200.

In some examples, the storage device 5200 includes any computer-operated hardware suitable for storing and/or retrieving data. In certain examples, storage device 5200 is integrated in the computer device 5000. In some examples, the storage device 5200 includes a database, such as a local database or a cloud database. In certain examples, the storage device 5200 includes one or more hard disk drives. In various examples, the storage device is external and is configured to be accessed by a plurality of server systems. In certain examples, the storage device includes multiple storage units such as hard disks or solid state disks in a redundant array of inexpensive disks (RAID) configuration. In some examples, the storage device 5200 includes a storage area network (SAN) and/or a network attached storage (NAS) system.

One or More Examples of Machine Learning According to Various Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

Examples of Certain Implementations of the Present Disclosure

In certain embodiments, the systems and methods of the present disclosure map all policy journey actions of a plurality of policy scenarios on a common timeline by sharing a validation clock (e.g., server clock). That is, instead of serially, the plurality of scenarios run in parallel with optimized time-travel and minimal clock jumps and/or time jumps, since all clock movements are now on the same common timeline. In some examples, the clock movements are only forward in time on the common timeline, which avoid the need to turn-back-the-clock. In certain examples, the clock movements are determined in view of action time ranges of the actions such that every time jump may fall within as many action time ranges as possible, wherein each time range corresponds to an action of a policy scenario. In various examples, the use of time range help reduces the number of clock jumps for executing all actions and/or scenarios.

As an example, two policy scenarios are to be validated: (Scenario A) Purchase policy A on any date (a first action time-A, a range), add driver on the 5$^{th}$ day of a first policy month (a second action time-A, a date), validate billing (a third action time-A, a date and/or range), and remove driver any day next policy month before billing (a fourth action time-A, a range); and (Scenario B) Purchase policy B on any date (a first action time-B, a range), add vehicle any day in the first month before billing (a second action time-B, a range), validate billing (a third action time-B, a date and/or range), and remove driver on the 10$^{th}$ day in the next policy month (a fourth action time-B, a range). Each billing may be part of a periodic invoice generation.

A traditional validation approach may include (1) move to a date corresponding to the first action time-A, purchase policy A, validate purchase policy, (2) move to day 5 corresponding to the second action time-A to add driver to policy A, validate all details associated with the policy, (3) move to a billing date corresponding to the third action time-A to validate billing for policy A, (4) move to a qualifying date in the next month corresponding to the fourth action time-A to remove the driver from policy A and validate all details associated with the policy, then (5) move to a date corresponding to the first action time-B and purchase policy B and validate all details associated with the policy, (6) move to a qualifying date corresponding to the second action time-B to add vehicle to policy B and validate all details associated with the policy, (7) move to billing date corresponding to corresponding to the third action time-B to validate billing for policy B, and move to day 10 in the next policy month corresponding to the fourth action time-B to remove driver from policy B and validate all details associated with the policy. As described, the traditional validation process, one that validates serially, would require eight time jumps to validate all eight actions of the two policy scenarios.

In contrast, the systems and methods of the present disclosure may validate the same two policy scenarios by (1) move to a date, corresponding to both the first action time-A and the first action time-B, to purchase policy A and purchase policy B, and to validate both policy purchases (2) move to day 5, corresponding to the second action time-A and second action time-B, to add driver to policy A and add vehicle to policy B, and to validate all details associated with policies, (3) move to a billing date of a month 1, corresponding to the third action time-A and the third action time-B, to validate billing for both policy A and policy B, and (4) move to day 10 of month 2, corresponding to the fourth action time-A and the fourth action time-B, to remove driver from policy A and remove driver from policy B, and validate all details associated with both policies. As shown, the systems and methods of the present disclosure, by validating in parallel on a common timeline with a shared validation clock (e.g., server clock), only took four time jumps to validate all eight actions of the two policy scenarios, half of the amount of jumps the traditional validation process used. Assuming that each time jump required the same amount of testing time to execute, the systems and methods of the present disclosure effectively reduced the validation time by 50%.

In certain embodiments, the systems and methods of the present disclosure validate multiple policy scenarios by validating or executing each scenario of the multiple scenarios on a separate thread, where all threads share the same validation clock (e.g., server clock). For example, when the validation clock (e.g., server clock) moves to a first validation time corresponding to a first action time on the first thread which validates a first scenario, all other threads also moved to the first validation time. Multiple time jumps, which may be referred to as a time resource update, may be requested by the multiple threads to validate their corresponding next policy action. The systems and methods of the present disclosure may determine the earliest time jump request amongst the multiple requests and creates a schedule for subsequent jumps to reduce the quantity of time jumps to validate all corresponding policy actions. In certain examples, the systems and methods of the present disclosure reproduce production scenarios that mimics occurrence of scenarios in production where multiple policies follow their independent journey while being in existence with other polices on the same timeline (e.g., without impacting each other).

In certain embodiments, the systems and methods of the present disclosure simulate a plurality of policy scenarios for the same user (e.g., candidate client) or same scenario for multiple different users. In some examples, the systems and methods of the present disclosure validate different types of policies in parallel, such as auto, home, renters, life. In various examples, the systems and methods of the present disclosure tests the capability of an insurance software, such as its capacity to handle a large amount of policies at the same time, with each policy having multiple policy actions. The scenarios for validation may be predesigned to test the wide range of possible real-life scenarios, which may be designed in view of historic policy lifecycles, and/or generated (e.g., randomly or manually) by a user, such as to simulate particularly resource-intensive scenarios.

In certain embodiments, the systems and methods of the present disclosure select validation times such that each validation time validates as many policy actions across the multiple policy scenarios as possible. For example, a validation time may fall on a time on the common timeline which is within a first action time range corresponding to a policy action on a first thread, a second action time range corresponding to a policy action on a second thread, and/or a third action time range corresponding to a policy action on a third thread. Each of the first action time range, the second action time range, and the third action time range may be a time point.

Examples of Certain Embodiments of the Present Disclosure

According to various embodiments, a computer-implemented method for validating a plurality of policies includes receiving a plurality of policies, each policy of the plurality of policies associated with a policy lifecycle including one or more validation actions, each validation action of the one or more validation actions being associated with an action time; mapping the one or more validation actions associated with each policy of the plurality of policies on a common timeline of a shared clock; and determining the plurality of validation times based at least in part upon the action time associated with each validation action of the one or more validation actions by at least minimizing the amount of validation times of the plurality of validation times; and/or maximizing the amount of validation actions contained within each validation time of the plurality of validation times on average across the plurality of validation threads. In certain examples, the method is implemented according to at least FIG. 2.

In some embodiments, the computer-implemented method further includes parallelly validating the plurality of policies by at least: moving the shared clock forward in time through a plurality of validation times; and executing the one or more validation actions associated with the plurality of policies at the plurality of validation times.

In some embodiments, parallelly validating the plurality of policies based at least in part upon moving the shared clock forward in time includes preventing the shared clock to move backward in time.

In some embodiments, parallelly validating the plurality of policies includes validating each policy of the plurality of policies in a separate thread of a plurality of validation threads.

In some embodiments, executing the one or more validation actions associated includes executing the one or more validation actions parallelly across different threads of the plurality of validation threads and sequentially and/or parallelly within each thread.

In some embodiments, moving the shared clock forward in time through a plurality of validation times includes moving to a first validation time of the plurality of validation times before moving to a second validation time of the plurality of validation times. In various examples, the first validation time is earlier than the second validation time. In some examples, the first validation time contains a first validation action on a first validation thread of the plurality of validation threads and is associated with a first action time. In some examples, the second validation time contains a second validation action on a second validation thread of the plurality of validation threads and is associated with a second action time.

In some embodiments, one or more policies of the plurality of policies has a policy lifecycle spanning one of one or more hours, one or more days, one or more weeks, one or more months, one or more years, and one or more decades.

In some embodiments, the action time is one of a time point and a time range.

In some embodiments, the one or more validation actions includes policy purchase, driver modification, driver addition, driver removal, invoicing, vehicle modification, vehicle addition, vehicle removal, coverage modification, property modification, property addition, property removal, user info modification, policy reinstatement, policy repurchase, policy rewrite, policy re-rating, and/or policy termination.

According to various embodiments, a system for validating a plurality of policies includes: a policy receiving module configured to receive a plurality of policies, each policy of the plurality of policies associated with a policy lifecycle including one or more validation actions, each validation action of the one or more validation actions being associated with an action time; an action mapping module configured to map the one or more validation actions associated with each policy of the plurality of policies on a common timeline of a shared clock; and a validation time determining module configured to determine the plurality of validation times based at least in part upon the action time associated with each validation action of the one or more validation actions by at least one of: minimizing the amount of validation times of the plurality of validation times; and maximizing the amount of validation actions contained within each validation time of the plurality of validation times on average across the plurality of validation threads. In certain examples, the system is implemented according to at least FIG. 1.

In some embodiments, the system further includes a policy validating module configured to parallelly validate the plurality of policies by at least: moving the shared clock forward in time through a plurality of validation times; and executing the one or more validation actions associated with the plurality of policies at the plurality of validation times.

In some embodiments, the policy validating module is configured to prevent the shared clock to move backward in time.

In some embodiments, the policy validating module is configured to validate each policy of the plurality of policies in a separate thread of a plurality of validation threads.

In some embodiments, the policy validating module is configured to execute the one or more validation actions parallelly across different threads of the plurality of validation threads and sequentially and/or parallelly within each thread.

In some embodiments, the policy validating module is configured to move the shared clock to a first validation time of the plurality of validation times before to a second validation time of the plurality of validation times. In various examples, the first validation time is earlier than the second validation time. In certain examples, the first validation time contains a first validation action on a first validation thread of the plurality of validation threads and is associated with a first action time. In certain examples, the second validation time contains a second validation action on a second validation thread of the plurality of validation threads and is associated with a second action time.

According to various embodiments, a non-transitory computer-readable medium with instructions stored thereon, that when executed by a processor, causes the processor to perform: receiving a plurality of policies, each policy of the plurality of policies associated with a policy lifecycle including one or more validation actions, each validation action of the one or more validation actions being associated with an action time; mapping the one or more validation actions associated with each policy of the plurality of policies on a common timeline of a shared clock; and determining the plurality of validation times based at least in part upon the action time associated with each validation action of the one or more validation actions by at least one of: minimizing the amount of validation times of the plurality of validation times; and maximizing the amount of validation actions contained within each validation time of the plurality of validation times on average across the plurality of validation threads. In certain examples, the non-transitory computer-readable medium is implemented according to at least FIG. 2.

In some embodiments, the non-transitory computer-readable medium, when executed by the processor, further causes the processor to perform: parallelly validating the plurality of policies by at least: moving the shared clock forward in time through a plurality of validation times; and executing the one or more validation actions associated with the plurality of policies at the plurality of validation times.

Examples of Additional Embodiments of the Present Disclosure

In various embodiments, a method for validating a plurality of policies, the method includes receiving a plurality of policies, each policy of the plurality of policies associated with a policy lifecycle including one or more validation actions, each validation action of the one or more validation actions being associated with an action time; mapping the one or more validation actions associated with each policy of the plurality of policies on a common timeline of a shared clock; and parallelly validating the plurality of policies by at least: moving the shared clock forward in time through a plurality of validation times; and executing the one or more validation actions associated with the plurality of policies at the plurality of validation times.

In various embodiments, a system for validating a plurality of policies includes a policy receiving module configured to receive a plurality of policies, each policy of the plurality of policies associated with a policy lifecycle including one or more validation actions, each validation action of the one or more validation actions being associated with an action time; an action mapping module configured to map the one or more validation actions associated with each policy of the plurality of policies on a common timeline of a shared clock; and a policy validating module configured to parallelly validate the plurality of policies by at least: moving the shared clock forward in time through a plurality of validation times; and executing the one or more validation actions associated with the plurality of policies at the plurality of validation times.

In various embodiments, a non-transitory computer-readable medium with instructions stored thereon, that when executed by a processor, causes the processor to perform: receiving a plurality of policies, each policy of the plurality of policies associated with a policy lifecycle including one or more validation actions, each validation action of the one or more validation actions being associated with an action time; mapping the one or more validation actions associated with each policy of the plurality of policies on a common timeline of a shared clock; and parallelly validating the plurality of policies by at least: moving the shared clock forward in time through a plurality of validation times; and executing the one or more validation actions associated with the plurality of policies at the plurality of validation times.

Examples of Other Embodiments of the Present Disclosure

In other embodiments, a method includes evaluating a plurality of policy test cases, each comprising a time schedule, actions, and validations, for the next scheduled event or time range within which an event may fall; selecting a point-in-time that meets the criteria for as many test cases as possible and falls before the time range or specific event for the rest of the test cases; advancing to that point-in-time; allowing the tests cases whose criteria has been met to execute until they have selected a new point-in-time or time range; and noticing if natural time movement has made additional test cases eligible for execution; repeating these steps until all test cases are completed. In some examples, the method is applied for any plurality of time-sequenced execution threads instead of policy test cases. In some examples, the method is applied where time is not tied to real-world time but rather just a number that can be changed representing a virtual time clock. In some examples, the execution of test cases happens in parallel. In some examples, the method is applied to any shared monotonically-increasing shared resource instead of time. In some examples, in addition to a plurality of test cases, a plurality of related scheduled actions is also executed at specific times, such as by allowing the additional scheduled actions to execute on their schedules in parallel when possible and sequentially when not possible. In some examples, the scheduled events are all particular times. In some examples, the scheduled events are all time ranges. In some examples, policies do not exist before a test case is scheduled and running. In some examples, a clock needs to move to more than just validation times. In some examples, there are times perform non-validation actions in both the test cases and in the underlying policy system. In some examples, tests that use less than a shared-clock hour is implemented.

Additional Considerations According to Certain Embodiments

In certain embodiments, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for determining validation times, the method comprising:
    receiving a plurality of policies, each policy of the plurality of policies associated with a policy lifecycle including one or more validation actions, each validation action of the one or more validation actions being associated with an action time;
    mapping the one or more validation actions associated with each policy of the plurality of policies on a common timeline of a shared clock, the shared clock being a clock controlled by one or more processors of a computer system and configured to be moved independently from a system clock of the computer system;
    determining the plurality of validation times based at least in part upon the action time associated with each validation action of the one or more validation actions by at least one of:
        minimizing the amount of validation times of the plurality of validation times; and
        maximizing the amount of validation actions contained within each validation time of the plurality of validation times on average across the plurality of validation threads; and
    parallelly validating the plurality of policies based at least in part upon the one or more validation actions and the plurality of validation times.

2. The computer-implemented method of claim 1, wherein the
    parallelly validating the plurality of policies includes:
        moving the shared clock forward in time through a plurality of validation times; and
        executing the one or more validation actions associated with the plurality of policies at the plurality of validation times.

3. The computer-implemented method of claim 2, wherein the parallelly validating the plurality of policies based at least in part upon moving the shared clock forward in time includes preventing the shared clock to move backward in time.

4. The computer-implemented method of claim 2, wherein the parallelly validating the plurality of policies includes validating each policy of the plurality of policies in a separate thread of a plurality of validation threads.

5. The computer-implemented method of claim 4, wherein the executing the one or more validation actions associated includes one of:
    executing the one or more validation actions parallelly across different threads of the plurality of validation threads and sequentially within each thread; and
    executing the one or more validation actions parallelly across different threads of the plurality of validation threads and parallelly within each thread.

6. The computer-implemented method of claim 4, wherein:
    the moving the shared clock forward in time through a plurality of validation times includes moving to a first validation time of the plurality of validation times before moving to a second validation time of the plurality of validation times;
    the first validation time being earlier than the second validation time;
    the first validation time containing a first validation action on a first validation thread of the plurality of validation threads and associated with a first action time;
    the second validation time containing a second validation action on a second validation thread of the plurality of validation threads and associated with a second action time; and
    the first validation time being earlier than the second validation time.

7. The computer-implemented method of claim 1, wherein one or more policies of the plurality of policies has a policy lifecycle spanning one of one or more hours, one or more days, one or more weeks, one or more months, one or more years, and one or more decades.

8. The computer-implemented method of claim 1, wherein the action time is one of a time point and a time range.

9. The computer-implemented method of claim 1, wherein the one or more validation actions includes one of policy purchase, driver modification, driver addition, driver removal, invoicing, vehicle modification, vehicle addition, vehicle removal, coverage modification, property modification, property addition, property removal, user info modification, policy reinstatement, policy repurchase, policy rewrite, policy re-rating, and policy termination.

10. A system for determining validation times, the system comprising:
- a policy receiving module implemented by one or more processors and configured to receive a plurality of policies, each policy of the plurality of policies associated with a policy lifecycle including one or more validation actions, each validation action of the one or more validation actions being associated with an action time;
- an action mapping module implemented by the one or more processors and configured to map the one or more validation actions associated with each policy of the plurality of policies on a common timeline of a shared clock;
- a validation time determining module implemented by the one or more processors and configured to determine the plurality of validation times based at least in part upon the action time associated with each validation action of the one or more validation actions by at least one of:
  - minimizing the amount of validation times of the plurality of validation times; and
  - maximizing the amount of validation actions contained within each validation time of the plurality of validation times on average across the plurality of validation threads; and
- a policy validating module implemented by the one or more processors and configured to parallelly validate the plurality of policies based at least in part upon the one or more validation actions and the plurality of validation times.

11. The system of claim 10, wherein:
the policy validating module is configured to:
- move the shared clock forward in time through a plurality of validation times; and
- execute the one or more validation actions associated with the plurality of policies at the plurality of validation times.

12. The system of claim 11, wherein the policy validating module is configured to prevent the shared clock to move backward in time.

13. The system of claim 11, wherein the policy validating module is configured to validate each policy of the plurality of policies in a separate thread of a plurality of validation threads.

14. The system of claim 13, wherein the policy validating module is configured to at least one of:
- execute the one or more validation actions parallelly across different threads of the plurality of validation threads and sequentially within each thread; and
- execute the one or more validation actions parallelly across different threads of the plurality of validation threads and parallelly within each thread.

15. The system of claim 13, wherein:
the policy validating module is configured to move the shared clock to a first validation time of the plurality of validation times before to a second validation time of the plurality of validation times;
the first validation time being earlier than the second validation time;
the first validation time containing a first validation action on a first validation thread of the plurality of validation threads and associated with a first action time;
the second validation time containing a second validation action on a second validation thread of the plurality of validation threads and associated with a second action time; and
the first validation time being earlier than the second validation time.

16. The system of claim 10, wherein the one or more policies of the plurality of policies has a policy lifecycle spanning one of one or more hours, one or more days, one or more weeks, one or more months, one or more years, and one or more decades.

17. The system of claim 10, wherein the action time is one of a time point and a time range.

18. The system of claim 10, wherein the one or more validation actions includes one of policy purchase, driver modification, driver addition, driver removal, invoicing, vehicle modification, vehicle addition, vehicle removal, coverage modification, property modification, property addition, property removal, user info modification, policy reinstatement, policy repurchase, policy rewrite, policy re-rating, and policy termination.

19. A non-transitory computer-readable medium with instructions stored thereon, that when executed by a processor, causes the processor to perform:
- receiving a plurality of policies, each policy of the plurality of policies associated with a policy lifecycle including one or more validation actions, each validation action of the one or more validation actions being associated with an action time;
- mapping the one or more validation actions associated with each policy of the plurality of policies on a common timeline of a shared clock, the shared clock being a clock controlled by one or more processors of a computer system and configured to be moved independently from a system clock of the computer system;
- determining the plurality of validation times based at least in part upon the action time associated with each validation action of the one or more validation actions by at least one of:
  - minimizing the amount of validation times of the plurality of validation times; and
  - maximizing the amount of validation actions contained within each validation time of the plurality of validation times on average across the plurality of validation threads; and
- parallelly validating the plurality of policies based at least in part upon the one or more validation actions and the plurality of validation times.

20. The non-transitory computer-readable medium of claim 19, wherein the
parallelly validating the plurality of policies includes:
- moving the shared clock forward in time through a plurality of validation times; and
- executing the one or more validation actions associated with the plurality of policies at the plurality of validation times.

* * * * *